(No Model.) 4 Sheets—Sheet 1.

J. P. SMITH & F. M. STEVENS.
TACKING MACHINE.

No. 467,665. Patented Jan. 26, 1892.

(No Model.) 4 Sheets—Sheet 2.

J. P. SMITH & F. M. STEVENS.
TACKING MACHINE.

No. 467,665. Patented Jan. 26, 1892.

Witnesses.
Eugene Humphrey
A. Pleaffer

Inventors
John P. Smith
Frank M. Stevens
per T. W. Porter Atty (No Model.) 4 Sheets—Sheet 3.
J. P. SMITH & F. M. STEVENS.
TACKING MACHINE.
No. 467,665. Patented Jan. 26, 1892.
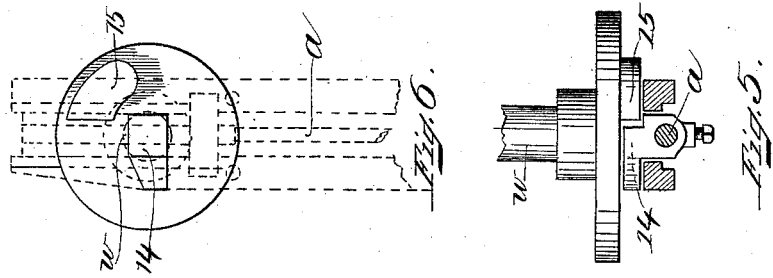
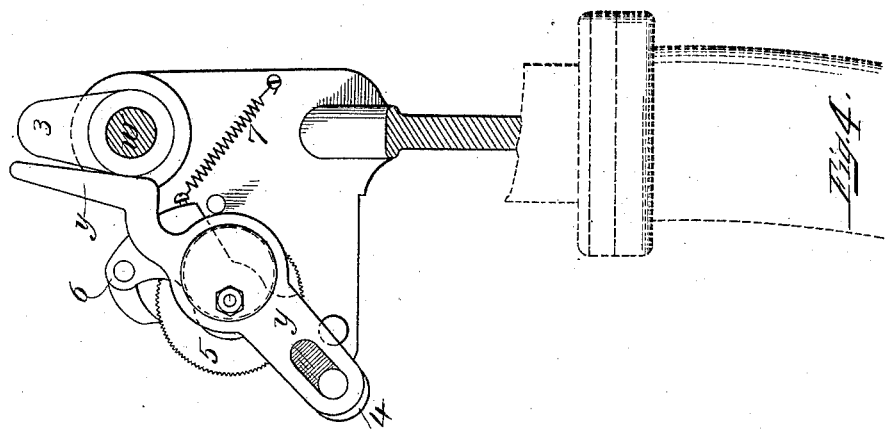
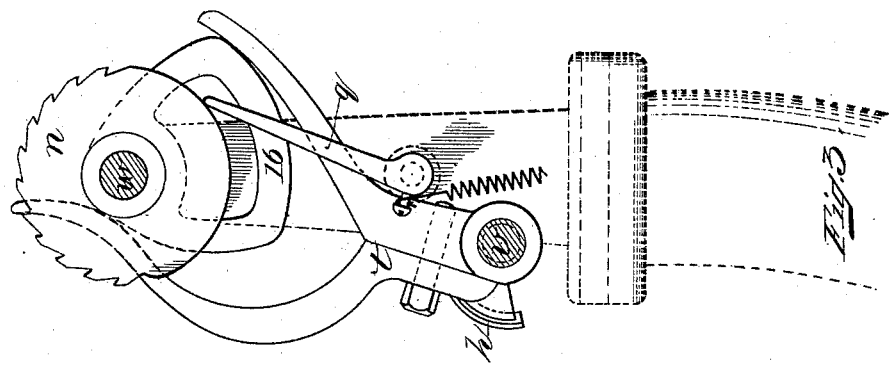
Witnesses:
Eugene Humphrey
A. B. Coffin
Inventors
John P. Smith
Frank M. Stevens
for T. W. Porter Atty (No Model.) 4 Sheets—Sheet 4.

J. P. SMITH & F. M. STEVENS.
TACKING MACHINE.

No. 467,665. Patented Jan. 26, 1892.

Witnesses:
Henry Hunt Letteney
Eugene Humphrey

Inventors
John P. Smith
Frank M. Stevens
per T. W. Porter Atty.

UNITED STATES PATENT OFFICE.

JOHN P. SMITH AND FRANK M. STEVENS, OF BOSTON, MASSACHUSETTS.

TACKING-MACHINE.

SPECIFICATION forming part of Letters Patent No. 467,665, dated January 26, 1892.

Application filed August 17, 1891. Serial No. 402,803. (No model.)

*To all whom it may concern:*

Be it known that we, JOHN P. SMITH and FRANK M. STEVENS, of Boston, in the county of Suffolk and State of Massachusetts, have invented a new and useful Improvement in Tacking-Machines, which will, in connection with the accompanying drawings, be hereinafter fully described, and specifically defined in the appended claims.

Figure 1:
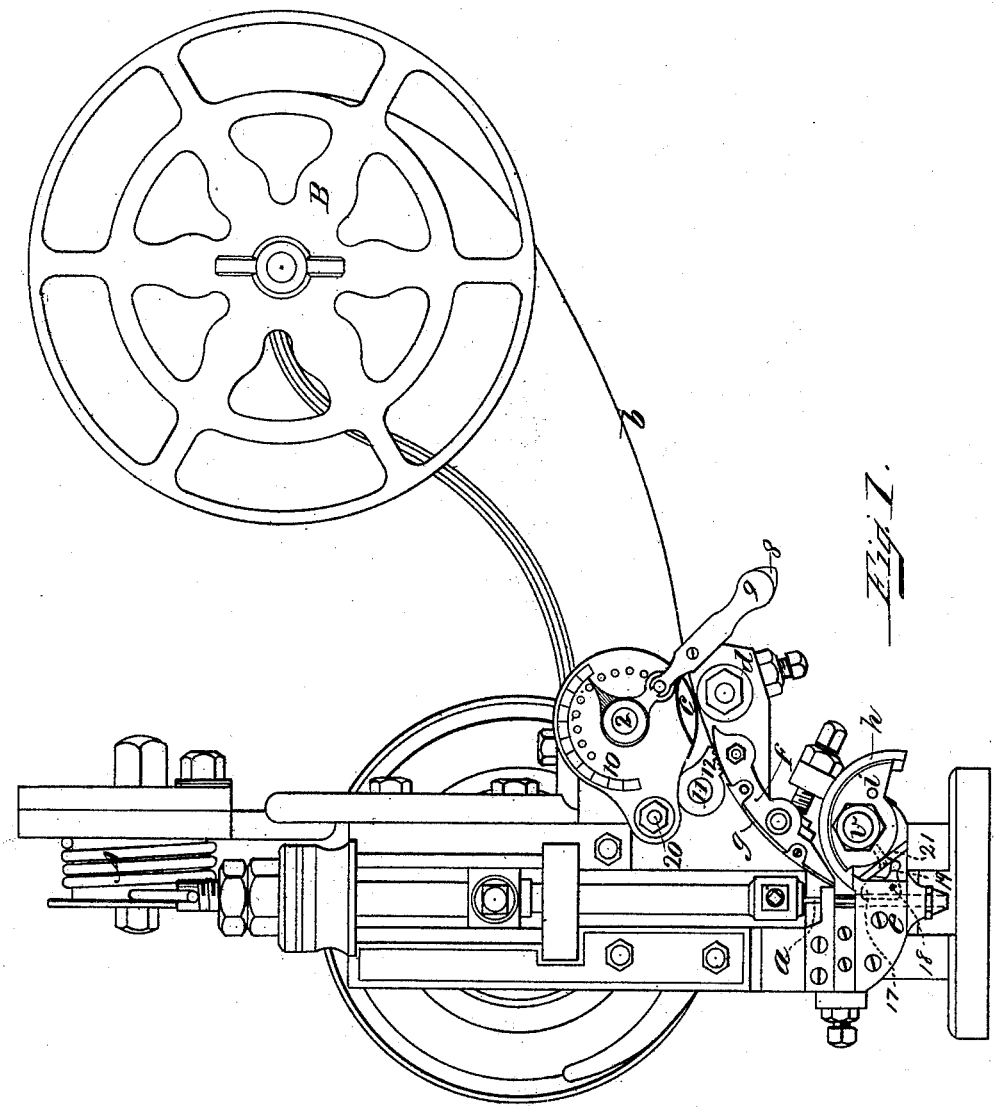
Figure 2:
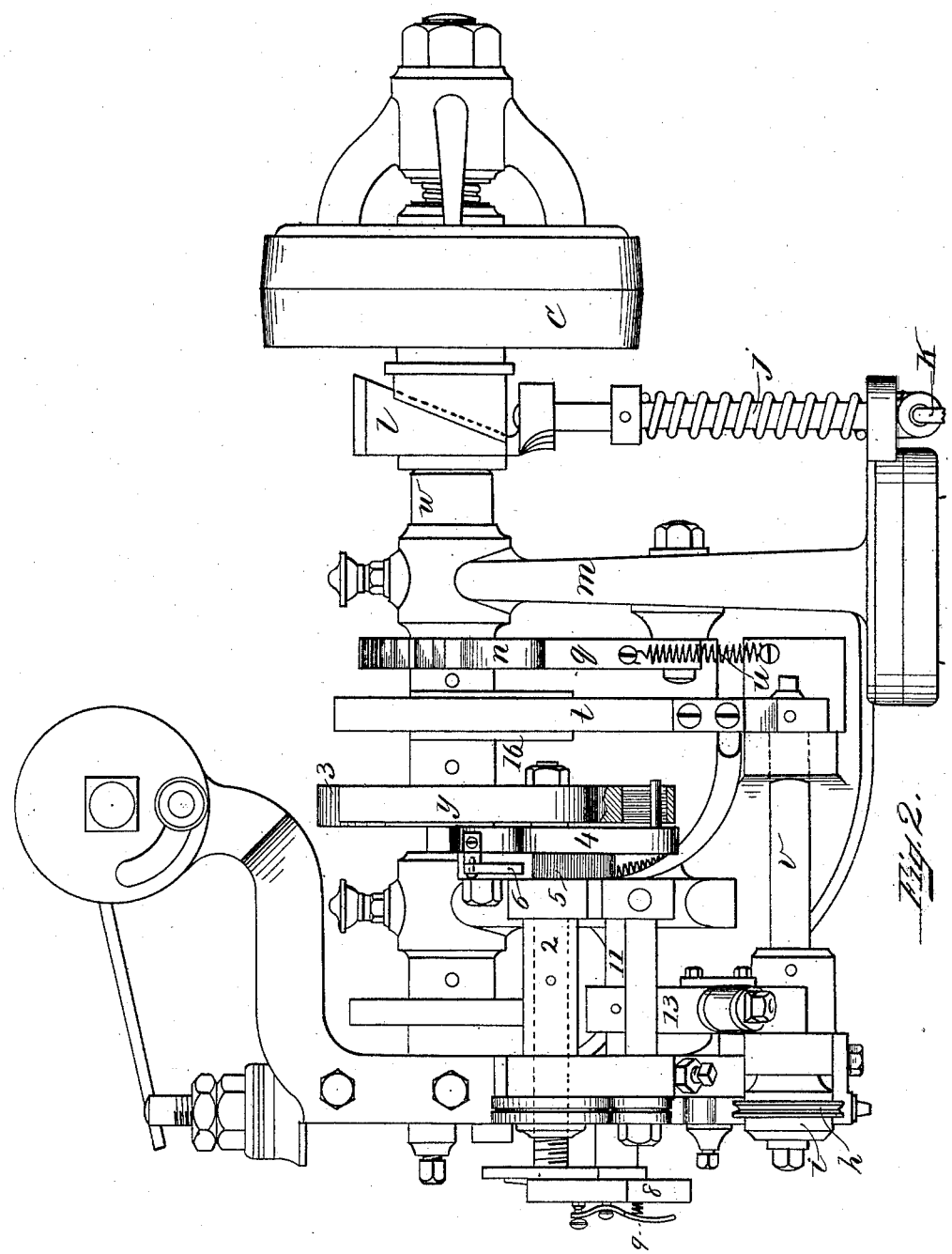
Figure 7:
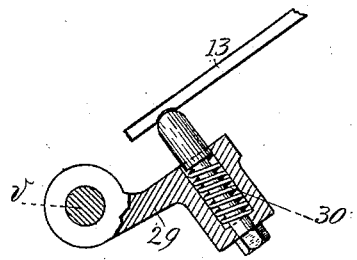
Figure 8:
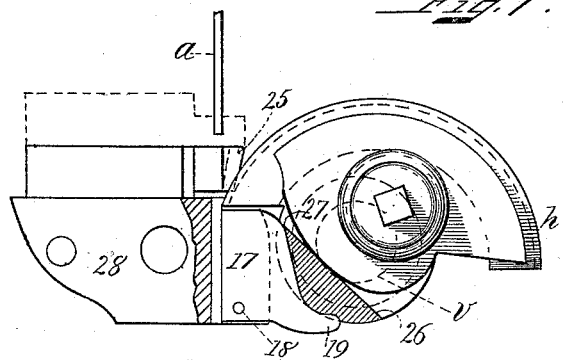
Figures 9, 10:
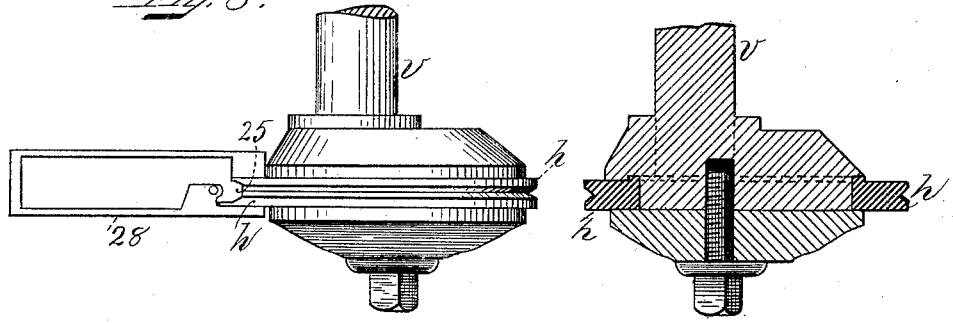

In said drawings, Figure 1 is a front elevation of our machine. Fig. 2 is an elevation taken at the right side of Fig. 1. Fig. 3 is a detached view taken from the rear of the machine. Fig. 4 is also a detached view taken from the rear of the machine, and Figs. 5 and 6 are parts to be hereinafter referred to. Fig. 7 shows, in side elevation and partly in section to show the spring, the cushioning-grip, which serves to bring the grip 12 firmly upon the wire when being cut and then raises the same when the wire feeds forward. Fig. 8 is a side elevation showing the wire-cutter, the lower portion of the nail-driver, the pin against which the cutter severs the wire, the body of the throat and the pivoted throat-piece, the body of the throat being in part broken away to show the parts. Fig. 9 is a horizontal section taken through the cutter and its holder in the line of the clamping-screw, and Fig. 10 is a top plan view of the parts shown in Fig. 8.

The object of our invention is to produce a machine that is simple, effective, and that will not be liable to get out of order by use; and it consists in certain features of novelty and the combinations thereof, as will be hereinafter described.

Referring again to said drawings, A represents the spring-head by which the driver *a* is impelled downward to drive the nail, a feature so common as to require no further comment at this point at least. In order to make the nail as it is driven, the wound wire is placed upon the scale B, from whence it is delivered at *b* through the wheels *c d* into throat *e*, where it is utilized, the wire after leaving roll B passing thence between wheels *c d*, as stated, and thence on to race *f* and beneath a thin metal cap *g*, secured to *f*, as shown, the nail being cut by the reciprocating cutter *h*, which is, in fact, a half-ring of steel interlocked in the hub *i* and which advances far enough to sever the wire *b* at each advance thereof, the nail being thus formed and driven into the shoe-sole held at the lower end of throat *e*. It next devolves upon us to describe the method of actuating the machine and of rendering the nail shorter or longer, as occasion may require.

In Fig. 2 the rod *j* is provided with a compressible spring that raises it to its place, as there shown, when released, and it is connected at top with the inclined piece *l* and at bottom with rod *k*, which is connected with a foot-treadle by which the machine is actuated, so that as *l* is depressed the pulley C is forced into the clutch, and rotation is thereby imparted to the machine, all of which is old, common, and well known. In said Fig. 2, and also in Fig. 3, *m* is a standard of the frame, and upon a stud therein is mounted a pawl *q*, engaging a clutch *n* on the main shaft *w* to prevent retrograde movement. A spring *u*, engaging pins in said frame and pawl, holds the latter to its work.

We next encounter a clutch *t*, rigidly secured upon shaft *v*, so as to actuate the cutter as the respective arms of said clutch are actuated by the cam 16 on the main shaft *w*, as shown in Fig. 3. Then next we arrive at the eccentric adjustment shown at *y* and as mounted upon the shaft 2 of the larger wire-feed wheel and as impelled by a driver 3, carried by said main shaft *w*. There is also shown the arm 4, that carries the pin fitting in the elongated slot at the lower end of the adjustment *y*, as also the finer feed-wheel 5, which is engaged by the pawl 6, secured in proper relation by spring 7, all as shown.

At the front end of shaft 2 is arranged the indicator 10, which is so made and positioned as to indicate the length of the nail to be made when the indicator is at any point thereon. Said indicator is attached to and held by stud 20, while arm 8 and parts carried by it are attached to shaft 2. The method adopted by us for regulating the length of the nail is to have the nail-feed work always the same distance, but when making short nails, or nails shorter than the longest, to have the parts work idly till just enough remains to make the nail of the required length.

In Figs. 8, 9, and 10 it will be observed that the circumferential groove in the convex face of cutter $h$ coacts with the beveled edge of piece 25, which at its lower edge enters the groove, and as the wire is always in said groove while cutter $h$ moves back and forth, therefore the wire will be severed by the action of the cutter and said wedge as the wire is held against the apex of the edge of said piece 25. In said Fig. 8 is shown the throat-piece 17, pivoted at 18 to the body of the throat 28 in a slot, in which said piece 17 is held and in which it vibrates in order that the wire may enter when said piece is opened at top, while the passage is straight and direct when it closes to produce a passage for the nail, said piece 17 being closed by contact of part 27 of the cutter-head, as shown in said Fig. 8, and it is opened at top by contact of part 26 of the cutter with its lower projection 19. Said parts 26 27 of the head may be a piece of steel or formed integral with the cutter-head. In Fig. 7 the lever 13 projects from shaft 11, on which it is firmly secured. The wire-grip 12 is carried by said shaft, and it extends from said shaft to the right, as viewed from the front as in Fig. 1, and hence as force is applied to said lever it forces grip 12 more firmly in contact with the wire resting on nail-race $f$, while the cushioned grip 29, secured on cutter-shaft $v$ and vibrated back and forth therewith, will as the shaft moves forward apply the force of its spring 30 to said lever to grip the wire, as stated, the object of the spring being to apply a yielding force to the wire.

In Figs. 5 and 6 the method by which the lifting force is applied to striker $a$ and is released at the proper moment is very clearly and fully shown, the view, Fig. 5, being a top view and the cam 15 being shown as carried by shaft $w$ and as just detached from the lifter 14 on the striker $a$, while in Fig. 6 the parts are shown in front side elevation, with the frame-work of the machine shown in dotted lines.

Referring again to Fig. 1 there will be observed the small vertical piece 17, fixed upon pivot 18 and having a small projection 19 to the right of said pivot. When cutter $h$ is thrown open, the piece of steel 21, secured to the cutter-head, bears against said projection and so holds it open while the nail enters the race; but when the cutter has reached the position shown the piece 17 has resumed the position shown, and so holds the nail vertical and in position to be driven, after which cutter $h$ returns to its former position and body 17 is inclined as before.

We present the following as a true statement of our claims:

1. In a tacking-machine, the combination of cutter $h$, formed as an arc of a circle and having a groove in its outer face for reception of the wire, the bevel-ended piece 25, constructed and arranged to coact with said cutter, and the vibrating piece 17, arranged to be automatically adjusted by the cutter-head, substantially as specified.

2. In a tacking-machine, the combination, with shaft $v$, carrying head $i$, and cutter $h$, of the clutch $t$, made fast on said shaft, and eccentric 16, actuated by main shaft $w$, substantially as specified.

3. In a tacking-machine, the combination, with the shaft 2, of eccentric $y$, secured to the rear end thereof, a pawl-carrier 4, the cam 5, pawl 6, and spring 7, all substantially as specified.

4. In a tacking-machine, the combination, with shaft 11, carrying the wire-grip 12, of the cushioned grip 29, secured on cutter-shaft $v$, and the arm 13, extending from shaft 11 and engaged by said cushioned grip, whereby the rocking forward of the knife will apply the force of the grip, substantially as specified.

5. In a tacking-machine, the combination, with head $h$, formed as an arc of a circle and having a groove in its outer face for reception of the wire, the bevel-ended piece 25, the driver $a$, and the piece 17, hinged as described, and formed to be alternately rocked upon said pivot by the cutter-head as the nail is being cut or driven, as specified.

JOHN P. SMITH.
F. M. STEVENS.

Witnesses:
T. W. PORTER,
EUGENE HUMPHREY.